United States Patent [19]
MacMullan

[11] 3,732,478
[45] May 8, 1973

[54] HIGH GAIN NULL-BALANCE SERVO SYSTEM

[75] Inventor: Samuel J. MacMullan, Newtown, Pa.

[73] Assignee: Leeds & Northrup Company, North Wales, Pa.

[22] Filed: Apr. 3, 1972

[21] Appl. No.: 240,637

Related U.S. Application Data

[63] Continuation-in-part of Ser. No. 126,667, March 22, 1971, abandoned.

[52] U.S. Cl..................................318/616, 318/618
[51] Int. Cl...............................................G05b 5/01
[58] Field of Search....................318/615, 616, 617, 318/618, 609, 610

[56] References Cited

UNITED STATES PATENTS

| | | | |
|---|---|---|---|
| 2,549,829 | 4/1951 | Lilja | 318/616 |
| 2,913,649 | 11/1959 | McKenney et al | 318/616 X |
| 3,013,194 | 12/1961 | Cary | 318/618 |
| 3,048,759 | 8/1962 | Howard | 318/616 |
| 3,373,675 | 3/1968 | Best | 318/616 X |
| 3,460,013 | 8/1969 | Gaylor | 318/616 X |
| 3,512,060 | 5/1970 | Floyd | 318/616 X |

*Primary Examiner*—Benjamin Dobeck
*Attorney*—Richard E. Kurtz et al.

[57] ABSTRACT

A multi-loop, high-gain null-balance servo measuring system having low sensitivity to parameter variations and comprising a pre-amplifier, a post-amplifier and a DC motor for driving an adjustable circuit element. The circuit element is driven by the motor in response to an error signal equal to the difference at null between an unknown input signal and a restoring signal provided by the overall system or outer loop feedback which represents the position of the adjustable circuit element. Reactive means are provided for establishing at least one inner loop feedback path for applying velocity and acceleration signal components to the input of the post-amplifier.

29 Claims, 17 Drawing Figures

HIGH GAIN NULL-BALANCE SERVO SYSTEM

RELATED APPLICATIONS

This application is a continuation-in-part of application Ser. No. 126,667, filed Mar. 22, 1971 and now abandoned.

BACKGROUND OF THE INVENTION

This invention relates to a null-balance servo system, and more particularly to a high-gain null-balance servo system for measuring an unknown represented by an input signal.

Such systems comprise a pre-amplifier and associated circuitry for generating an error signal representing the difference at null between an unknown input signal and a restoring signal in the form of a feedback signal from an adjustable circuit element. The amplified error signal from the pre-amplifier is then applied to a post-amplifier having an output connected to a DC motor which is mechanically coupled to the adjustable circuit element. The position of the adjustable circuit element is represented by the restoring signal. The restoring signal is applied to the circuitry for generating an error signal through an overall system or outer feedback loop.

In many cases, the small signal response of the prior art systems has been dependent upon parameters of the DC motor and the adjustable circuit element. More particularly, the dominant time constants and hence the dynamic performance of the system have varied with changes in motor time constants and coefficients such as a motor voltage-to-velocity coefficient, $k_m$, a motor time constant $\tau_m$, and adjustable circuit element parameters. Thus the dynamic performance of the system was affected by any replacement of motors or variations in the motor parameters. Even changes in load mass due to the mounting of accessories will affect the dynamic performance of the system. As a consequence, adjustable resistors and capacitors have been utilized to maintain dynamic performance by permitting suitable circuit adjustments.

In some prior art systems, inner feedback loops have been provided. A first inner loop provides a direct coupled velocity feedback path to the input of the post-amplifier. A bridge is used to derive a velocity signal directly from the motor. A second inner loop provides a direct coupled motor voltage feedback path. The primary disadvantage of this system is due to the fact that the bridge must be unbalanced by a certain amount so that variations in parameters do not result in a positive feedback component that increases with frequency thereby causing instability: this balance results in a feedback that is proportional to the motor current and a consequent degradation of static gain producing excessive deadband.

Furthermore, prior art null-balance servo systems have generally demonstrated instability when gain and damping are adjusted. For example, small changes in gain can lead to oscillatory transient modes on the one hand and excessively long transient modes on the other. These problems are compounded by the multiplicity of ways in which gain and damping are adjusted in any given prior art system.

SUMMARY OF THE INVENTION

It is an overall object of this invention to provide a null-balance servo system closely approximating a desired small signal response.

It is a still more specific object of this invention to provide a null-balance servo system where changes in motor parameters do not substantially affect the small signal dynamic performance of the system.

It is another specific object of this invention to provide a null-balance servo system where changes in load mass due to the mounting of accessories do not substantially affect the small signal dynamic performance.

It is a further specific object of this invention to provide a null-balance servo system where changes in parameters do not require significant adjustments in circuit components to maintain dynamic performance.

It is a still further specific object of this invention to provide a null-balance servo system without excessive deadband.

In accordance with these and other objects of the invention, a high-speed null-balance servo system embodying the invention comprises means for producing an error signal related to the difference between an input signal and an overall system feedback signal for restoring balance to the system, a DC pre-amplifier for amplifying the error signal, and a DC post-amplifier coupled to the output of the pre-amplifier. A means for producing feedback signals comprises a DC motor and associated circuitry connected to the output of the post-amplifier and an adjustable circuit element mechanically coupled to the motor. An outer loop feedback means couples the adjustable circuit element to the means for producing an error signal. An inner loop feedback means including reactive means couples the means for producing feedback signals to the input of the post-amplifier so as to apply velocity and the acceleration feedback signal components to the input of the post-amplifier, the acceleration feedback signal component being substantially free of the voltage drop across the motor resistance.

In one specific embodiment of the invention, a system is provided having a higher order than the order of the sub-loop including the pre-amplifier and circuitry for generating an error signal. This achieves reduced sensitivity to parameter variations for the small signal response to a given input since a wider stability margin can exist in lower order sub-loops. Thus, for example, variations in pre-amplifier gain or bandwidth causes reduced alterations of nominal system frequency responses.

The system of this specific embodiment includes an outer or first loop providing overall system feedback and second and third loops forming sub-loops within the first loop. A proportional plus derivative means coupled to the output of the adjustable circuit element interposed between the adjustable circuit element and the means for producing the error signal produces the overall system feedback signal including a velocity component. A reactive feedback means is coupled between the proportional plus derivative means and the input of the DC post-amplifier to establish the second and third sub-loops where the second sub-loop includes the pre-amplifier and the third sub-loop includes the post-amplifier, the motor, the adjustable circuit element, the proportional plus derivative means, and the reactive feedback means and where the third sub-loop acts like an integrator with respect to the second sub-loop.

In another specific embodiment, the subsystem defined by an inner loop providing velocity feedback to the DC post-amplifier is made stable by making the acceleration feedback gain depend on the tachometric coefficient of the motor, rather than the resistance of the motor. The velocity feedback gain depends only on stable feedback subsystems that are driven by the adjustable circuit element. Hence, the bandwidth of the aforesaid inner loop which is proportional to the ratio of gains of the velocity feedback loop and the acceleration feedback loop in a stable quantity. As a result, parameter variations have very little effect on the system dynamic performance even though the bandwidth of the subsystem may be of the same order as that of the overall system. In other words, the inner loop can provide a dominant time constant as a result of this improved stability. This is a particular advantage in systems where inner loop bandwidth is restricted. For example, inner loop bandwidth may be limited by compromising gearing back lash and mechanical resilience for the sake of economy. This is also an advantage in other servo systems that have "tight" coupling between the motor and the load. In such systems, the system bandwidth is still limited by the bandwidth that can be achieved in the higher bandwidth subsystem.

This specific embodiment also reduces the delays in response for small error signals by permitting a reduction in the feedback of the motor voltage derivative from the use of acceleration feedback. The motor voltage is proportional to the torque applied to the load when the load is at rest. When the derivative of this component is fed back, sufficient integrating time must elapse before sufficient torque is achieved to start the load in motion. By minimizing this feedback, reduced delays in response are achieved.

In this specific embodiment, the reactive means of the inner loop feedback means is coupled between the input to the post-amplifier and the circuitry associated with the DC motor as well as the adjustable circuit element. Separate reactive feedback paths may be provided for both the acceleration feedback and the velocity feedback from the circuitry associated with the DC motor and the adjustable circuit element. As an alternative, a combined reactive feedback path may be provided from the circuitry associated with the DC motor and the adjustable circuit element.

DESCRIPTION OF PREFERRED EMBODIMENTS

Figure 1:
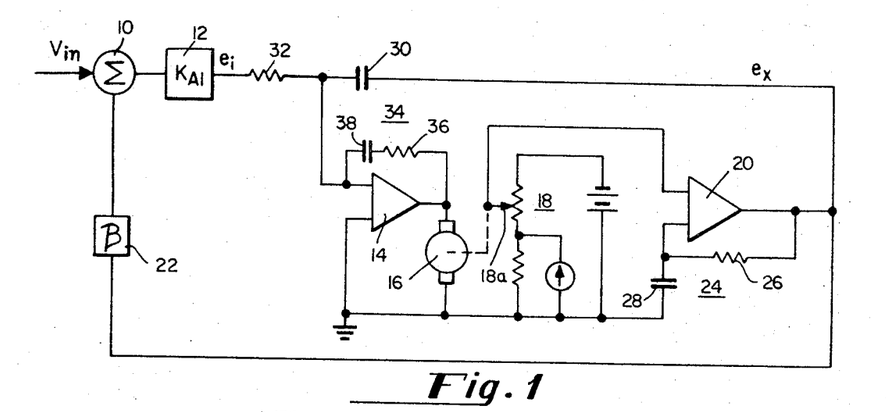
FIG. 1 is a schematic-block diagram of a null-balance servo system embodying the invention arranged to clearly show an outer loop and two sub-loops.

As shown in FIG. 1, a null-balance servo system comprises a means for generating an error signal representing the difference between an input signal and an overall system feedback restoring signal at a summing junction 10, a pre-amplifier 12 (shown in block-diagram form as having a gain $K_{A1}$), and a post-amplifier 14 connected to a terminal of a DC motor 16 which is mechanically coupled to an adjustable circuit element 18. As the adjustable tap 18a of the adjustable circuit element 18 moves in response to movement of the motor 16, a feedback signal is generated which is in turn applied to a feedback amplifier 20. The output of the feedback amplifier 20 is then coupled to the summing junction 10 by means of the outer loop feedback means including feedback network 22 (shown in block diagram form as having an attenuation factor $\beta$).

For a thorough understanding of the preferred embodiment of the invention, the circuit shown in FIG. 1 may be considered to consist of three feedback loops. The first loop is the overall or outer feedback loop including the summing junction 10, the pre-amplifier 12, the resistor 32, the post-amplifier 14, the motor 16, the adjustable circuit element 18, the feedback amplifier 20 and feedback network 22. The second loop is the pre-amplifier sub-loop including the summing junction 10, the pre-amplifier 12, the resistor 32, the capacitor 30, and the feedback network 22. The third loop is the post-amplifier sub-loop including the post-amplifier 14, the motor 16, the adjustable circuit element 18, the feedback amplifier 20 and the capacitor 30. Thus the inner loop feedback means including a reactive means in the form of a capacitor 30 completes the second and third sub-loops and provides velocity and acceleration feedback signal components for the input of the post-amplifier.

In accordance with the invention, the second order system of FIG. 1 is characterized by first and second dominant system time constants which determine the dynamic performance of the system. The first dominant system time constant is established by a proportional plus derivative means comprising an active RC filter network 24 associated with the feedback amplifier 20 and including a resistor 26 and a capacitor 28. This is a normal lead network in the feedback path of the overall servo loop which is designated as the first loop. This network is also involved in the third loop. Post-amplifier 14, a resistor 36, a capacitor 38, the motor 16, the adjustable circuit element 18, and the feedback amplifier 20 including the network 24 may be viewed as an amplifying device connected between $e_i$ and $e_x$, and having the capacitor 30 in its feedback path. Thus it will be seen that the third loop behaves in the manner of an integrator with respect to the second loop and the second dominant system time constant is established by the feedback capacitor 30 in combination with the resistor 32 connected to another summing junction at the input of the post-amplifier 14.

It can be seen from the above analysis that there is a first dominant time constant in the third loop which is also common to the first loop and a second dominant time constant in the second loop which is also common to the first loop. But these elements that make up the first and second dominant time constants appear in the first or overall loop in cascade and hence provide a second order servo system.

Returning now to the third or post-amplifier loop, it is to be noted there is a reactive feedback path from the output of post-amplifier 14 to an inverting input of the post-amplifier 14 consisting of resistor 36 and capacitor 38, which forms a post-amplifier integrator. The input to the post-amplifier 14 may be connected to either the inverting or the non-inverting input. If the circuit design calls for connection to the inverting input then the non-inverting input of the post-amplifier 14 is connected to circuit common. This post-amplifier integrator 34 applies an integrated error signal to the motor 16 where the gain of the post-amplifier integrator 34 is defined as the reciprocal of the integrator time constant which is proportional to the product $R_{32}C_{38}$ (seconds). In accordance with this invention, the gain of the post-amplifier integrator 34 must be sufficiently high so that the third loop acts like an integrator with respect to the second or pre-amplifier loop. The third loop is also characterized by another integrator time constant proportional to $R_{32}C_{30}$ which also determines the second dominant time constant. It has been found that wide tolerances in motor parameters do not appreciably affect the performance of this servo system. A high static, DC gain in the post-amplifier 14 provides small deadband at balance of the servo system. The third loop bandwidth is defined as that frequency range over which the third loop acts as the inverse of its feedback provided by the RC network 24 and the capacitor 30. In the system of FIG. 1, the third loop bandwidth may be expressed as $(kC_{30}R_{26}C_{28})/(C_{38m})$ (radians per second) where $k$ is the velocity of the adjustable circuit element 18a at steady state for a given signal magnitude applied to the motor 16. It can be seen by inspection of the foregoing expression for third loop bandwidth that reducing capacitor $C_{38}$ increases subsystem bandwidth.

Since post-amplifier integrator gain is inversely proportional to $C_{38}$, increasing integrator gain increases the the third loop bandwidth. By making the post-amplifier integrator gain sufficiently high, variations in the bandwidth of the third loop have an inconsequential effect on the overall system performance. In accordance with this invention, the third loop acts as integrator in the first loop for frequencies less than the loop three bandwidth. Under these conditions, it has been found that wide tolerances in motor parameters do not appreciably affect the performance of the system. Rather, the dynamic performance of the system is determined by the first dominant system time constant $R_{26}C_{28}$ and the second dominant system time constant $R_{32}C_{30}/K_{A1}\beta$ where these time constants are equal to $1/\omega_n$ for critical damping at the natural frequency $\omega_n$. Furthermore, high static or DC gain in the post-amplifier 14 provides small deadband at balance of the system.

The first time constant may be derived by inspection. It is well understood in the art that when an RC filter network such as the RC network 24 acts upon the output of an amplifier such as the amplifier 20, the inverse of the feedback transfer function of the high gain amplifier is the closed loop transfer function, in this case the first dominant time constant $R_{26}C_{28}$.

Accordingly, the active RC filter network 24 is characterized by the first order equation $$R_{26}C_{28}V'_{sw} + V_{sw} = c_x \quad (1)$$

where $V_{sw}$ is the voltage at the tap 18a, and $V'_{sw}$ stands for the time rate of change of $V_{sw}$.

The second dominant time constant may be derived as follows:

for signal balance at the post-amplifier 14 assuming high post-amplifier integrator gain $$e_x'C_{30} + (e_i/R_{32}) = 0; \quad (2)$$

for signal balance at the summing point 10

$$e_i = (e_xB - v_{in})K_{A1}, \quad (3)$$

by substitution of equation (3) into equation (2)

$$e_x'C_{30} + (K_{A1}/R_{32})e_xB - V_{in}) = 0; \quad (4)$$

by multiplying equation (4) by $R_{32}/K_{A1}$ $$e_x'(r_{32}/K_{A1}) C_{32} + Be_x - V_{in} = 0; \quad (5)$$

and upon deriving equation (5) by $B$ $$e_x'(R_{32}C_{30}/K_{A1}B) + e_x = V_{in}/B. \quad (6)$$

$R_{32}C_{30}/K_{A1}B$ is the second dominant time constant. Thus, $e_x$, the output of a first order system as expressed by equation (6) with an input $V_{in}$, is the output of another first order system as expressed by equation (1) with an output $V_{sw}$. Therefore, we have a second order system which is described by first and second dominant system time constants.

Figure 2:
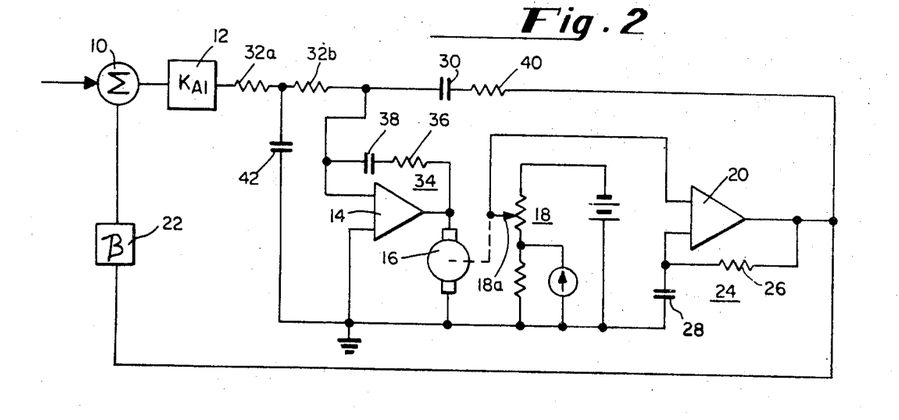
FIG. 2 is a schematic-block diagram of another system embodying the invention also arranged so as to clearly show an outer loop and two sub-loops.

In the embodiment of FIG. 2, a resistor in series with the capacitor 30 is divided into two center tapped resistors 32a and 32b with a capacitor 42 connected in shunt at the input to the post-amplifier 14. As in the embodiment of FIG. 1, the time constant (representing the bandwidth of the third loop) $C_{38}/KC_{30}$ is also made negligible. However, if the RC product or time constant of the network 24 is made equal to the RC product or time constant $R_{40}C_{30}$, unlike the embodiment of FIG. 1, the time constant of the lag network in the forward path and the time constant of the lead network in the feedback path are not due to the same RC network 24. This again creates a second order system which behaves as two first order systems, one system having a dominant time constant $R_{26}C_{28}$ and the other system having a dominant time quantity $(R_{32a}+R_{32b})C_{30}/k_{A1}\beta$. These dominant time constants must still be equal to $1/\omega_n$ for critically damped conditions at the natural frequency $\omega_n$.

As in the embodiment of FIG. 1, the third loop acts as an integrator with respect to the second loop having an integrator time constant proportional to the product $(R_{32a}+R_{32b})C_{30}$. The post-amplifier integrator has an integrating time constant proportional to the product $(R_{32a}+R_{32b})C_{38}$ and preferably less than the integrator time constant for the third loop.

The following table specifies suitable values for the capacitors and resistors of FIGS. 1 and 2 for $\omega_n$ equal to 100 radians per second:

| System Type FIG. No. | $R_{34}$ | $C_{30}$ microfarads | $C_{28}$ microfarads ($R_{26}=10k$) | $C_{42}$ microfarads | $R_{40}$ |
|---|---|---|---|---|---|
| $\cong \tau_m/C_{38}$ | | 2 | 1 | 4 | 5000 |
| 1 | $\cong \tau_m/C_{38}$ | 2 | 1 | 0 | 0 |

(Assumes $K_{A1}\beta = 2$ and $R_{32} = 10k$)

It will now be demonstrated that the system of FIG. 2 is equivalent to the system of FIG. 1. Since a capacitor acts as an open circuit at low frequencies, it is clear from inspection of FIG. 2 that the capacitor 30 dominates the branch including the capacitor 30 and the resistor 40 and that the capacitor 42 produces negligible shunting of the RC filter network including resistor 32a and 32b and the capacitor 42 at the post-amplifier input. As a result, the third loop acts as an integrator as it does in FIG. 1, and that the RC filter at the post-amplifier input acts simply as a resistor with a value $(R_{32a}+R_{32b}) \cdot (R_{32a}+R_{32b})$ may equal $R_{32}$ of FIG. 1 to provide strict equivalence between the systems of FIGS. 1 and 2. At high frequencies, the capacitors 30 and 42 of FIG. 2 tend to act as short circuits. Therefore the impedance of the branch including the capacitor 30 and the resistor 40 is determined by the resistor 40 and the RC filter at the input of the post-amplifier acts as an integrator. The combined effect of the RC filter and the third loop is that of an integrator in the loop 1.

It has been demonstrated that changes in motor parameters cause negligible variations in the system dynamic characteristics. The system exhibits other forms of insensitivity to parameter variations which may be understood from the following. A conventional DC motor, in particular a DC motor with a permanent magnet field produces a velocity of the adjustable circuit means for a given DC motor input magnitude when the DC motor input is slowly time varying or of low frequency. It therefore introduces a lag in the forward path of the system. In fact, the motor may be considered to have an integrator gain, $k_m$. At input frequencies that are sufficiently higher than the breakpoint frequency 1 (radians)/$\tau_m$ sec the motor produces an acceleration of the adjustable circuit means and thereby introduces two lags. The post-amplifier integrator also introduces a lag. However, since the loop comprising the motor and post-amplifier acts as an integrator in loop two, only one lag is introduced in loop two even where a DC motor producing more than one lag, for slowly time varying DC motor input, is utilized. In the situation where the one lag introduced into loop two, by loop three, is predominant in loop two; i.e., the pre-amplifier and feedback network do not exhibit appreciable frequency dependent behavior, the pre-amplifier gain and/or feedback gain $\beta$ may be varied over a wide range without causing instability, since this only changes the second dominant time constant without introducing oscillatory behavior. Of course, the second dominant system time constant is not affected. In another situation, another time constant may be included in loop two. For example, this may be due to a reduced bandwidth of the pre-amplifier, or to another lag network. This additional time constant may be provided in order to establish another dominant system time constant. Thus, a third order system with reduced sensitivity to parameter variations may be constructed. This is because the pre-amplifier loop has a sensitivity to parameter variations of a single loop second order system instead of that of a single loop third order system.

Figure 3:
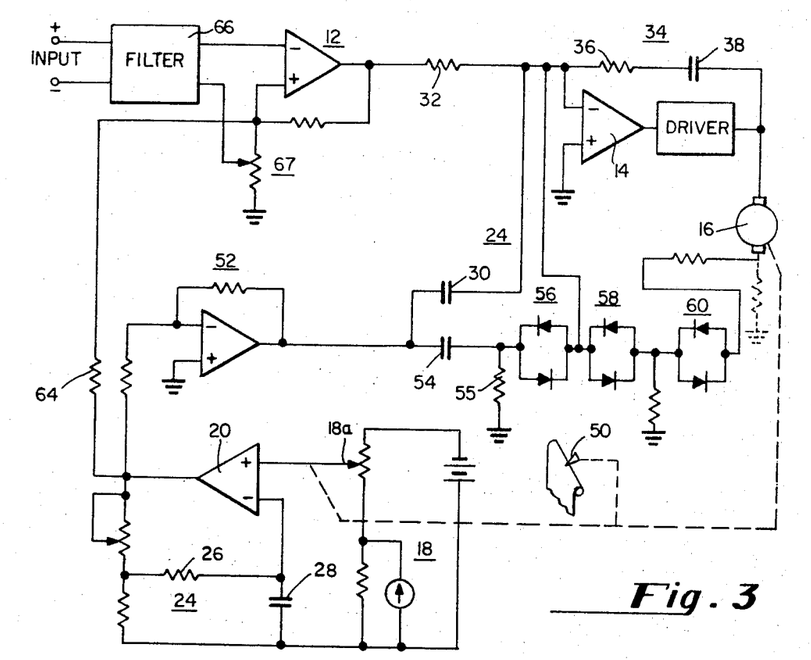
FIG. 3 is a more detailed schematic diagram of the system of FIG. 1 in a null-balance recorder.

Utilizing the same reference characters to identify the same elements, the system of FIG. 1 is shown in somewhat more detail in FIG. 3 as including a recorder pen 50 which is coupled to the adjustable circuit element or slide-wire tap 18a and the motor 16. In addition to the capacitor 30, the feedback path to the input of the post amplifier 14 also includes an inverter 52, a differentiating RC network 54 for deriving a velocity feedback signal, and a diode threshold network 56 for providing large velocity signal damping. A current constraint feedback path including diode threshold networks 58 and 60 is provided for applying a feedback signal to the input of the post-amplifier 14 thereby constraining current through the motor 16 to a tolerable level. Both the large signal velocity damping and the current constraint aspects of the system are more fully explained in copending application Ser. No. 20,885, filed Mar. 19, 1970, and assigned to the assignee of this invention. Other means for maintaining balance at the input to the post-amplifier so as to constrain the post-amplifier output will occur to those of ordinary skill in the art.

Since the network 24 associated with the feedback amplifier 20 does differentiate the position signal from the adjustable tap 18a, the feedback or restoring signal applied to the pre-amplifier 12 through a resistor 64 includes a velocity component and a position component. The restoring signal is then compared with an input signal applied at a filter 66 which results in the generation of an error signal at the output of the pre-amplifier 12. Note the use of the adjustable resistance 67 which is connected to the input of the amplifier 12. The adjustability of this resistance permits changes in both the span of the system and the gain of the amplifier without changing the sensitivity of the system as disclosed in copending application Ser. No. 20,880, filed Mar. 9, 1970 and assigned to the assignee of this invention.

Figure 4:
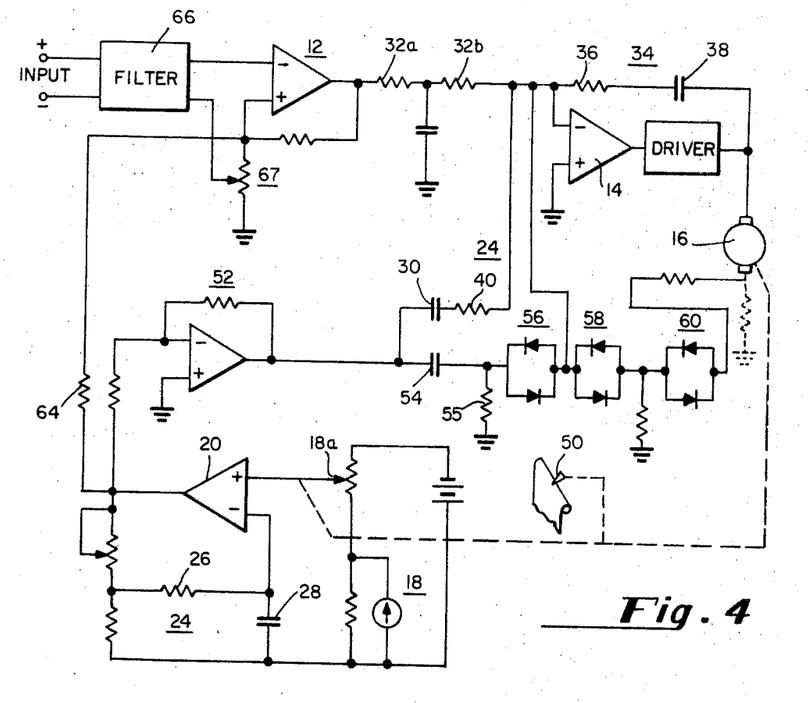
FIG. 4 is a more detailed schematic diagram of the system of FIG. 2 in a null-balance recorder.

In FIG. 4, the system of FIG. 2 is embodied in a null-balance recorder. Once again, identical reference characters are utilized to identify the same elements.

Other modifications in the previously described systems are possible. For example, the low pass filter effect provided by the resistors 32a and 32b and the capacitor 42 of FIG. 2 may be provided by the pre-amplifier 12 by virtue of reduced bandwidth. Different motors 16 may also be utilized. For example, a linear motor with limited output travel may be utilized to provide a controlled input to a mechanical amplifier with a force and motion gain such as that shown in U.S. Pat. No. 3,491,603. The DC motor may comprise an AC motor in combination with a modulator. The amplifier 14 in FIG. 1 may comprise a switching mode power output type amplifier. Details of one suitable switching mode amplifier are set forth in U.S. Pat. No. 3,384,833 — Hitt which is assigned to the assignee of this invention.

Although a second order system having two dominant time constants has been described in the foregoing, this invention is not so limited. For example, the invention may also be practiced in a third order system having an additional time constant at the input to the post-amplifier and in loop 2. $\beta$ may also have frequency dependent characteristics.

Figure 5:
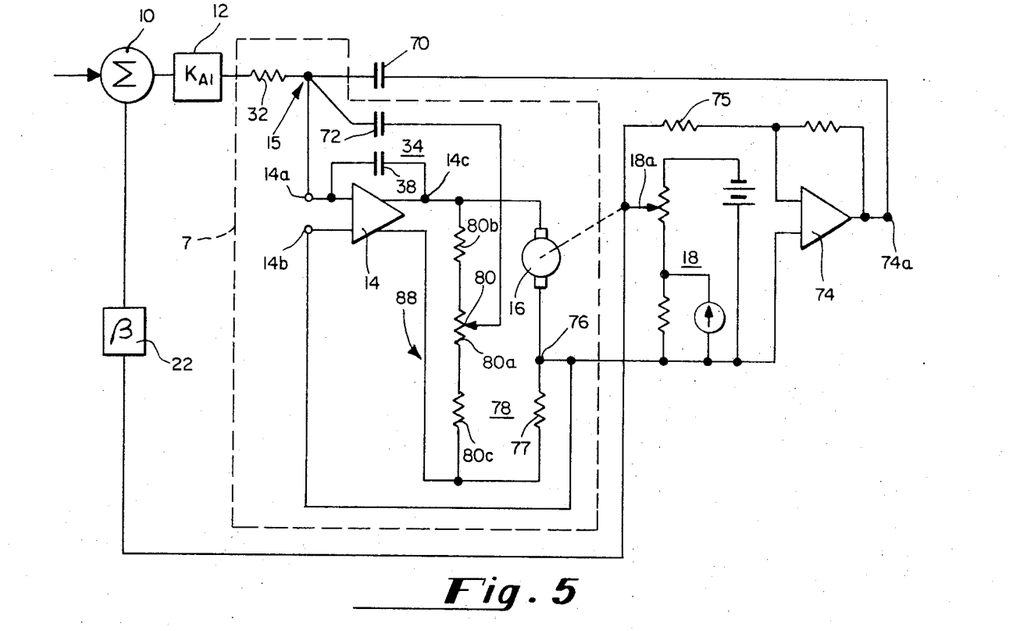
FIG. 5 is a schematic-block diagram of another system embodying the invention.

In the embodiment of FIG. 5, the reactive means of the inner loop feedback means comprises two capacitors 70 and 72 which provide two reactive feedback paths to the input of the post-amplifier 14. The capacitor 70 which differentiates a position signal derived from the tap 18a completes an inner velocity feedback loop via an inverting isolation amplifier 74 having one input connected to the tap 18a of the adjustable circuit element through a resistor 75. The other input of the isolation amplifier 74 is connected to a junction 76 between two arms of a bridge circuit 78 associated with the motor 16 where the motor 16 represents one arm of the bridge circuit. A tap 80 represents an intermediate point in the resistive path comprised of resistors 80a to 80c. As shown, the tap 80 is an adjustable junction between the opposite arms of the bridge circuit. This is part of the inner acceleration feedback loop including the capacitor 72 where the capacitor 72 differentiates a velocity signal derived from the tap 80 to provide an acceleration feedback signal component substantially free of the voltage drop across the motor resistance.

The position feedback by way of feedback network 22 to summing point 10 is similar to that shown in FIGS. 1 and 2. The preamplifier 12 shown in FIGS. 5, 6 and 7 may be either a voltage gain pre-amplifier or a current gain pre-amplifier.

The current through the motor 16 must pass through the resistor 77 in order to reach the return connection 88 of the output of the amplifier 14. A voltage signal is developed at the return connection 88 with respect to common 76, the magnitude of which is proportional to the IR drop component of the motor voltage and polarity of which is opposite to that of the IR drop.

Figure 5A:
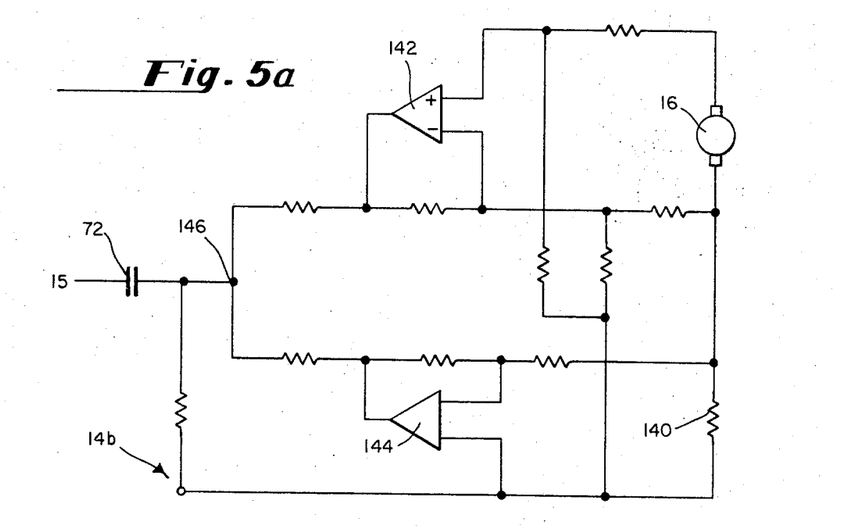
FIG. 5a is a schematic diagram of alternative circuitry which may be used in the system of FIG. 5 to produce a velocity feedback signal component.

The velocity signal component derived from the tap 80 of FIG. 5 represents the motor voltage minus the signal proportional to the IR drop. It will be appreciated that other circuit arrangements may be provided to achieve a velocity proportional to the motor voltage minus a signal proportional to the IR drop which is utilized to obtain an acceleration feedback signal component substantially free of the IR motor drop. For example, FIG. 5a shows a circuit arrangement wherein the circuitry associated with the motor 16 comprises a current sensing resistor 140 and operational amplifiers 142 and 144. The amplifier 142 which is connected across the terminals of the motor 16 produces an output signal representing motor voltage referred to circuit common 146. The operational amplifier 144 has an input connected to the current sensing resistor 140 to produce an output signal representing an inverted motor current referred to circuit common. The motor voltage from the output of the amplifier 142 and the inverted motor current signal obtained from the output of amplifier 144 are then summed at a summing point 146 to obtain the velocity signal component.

Figure 5B:
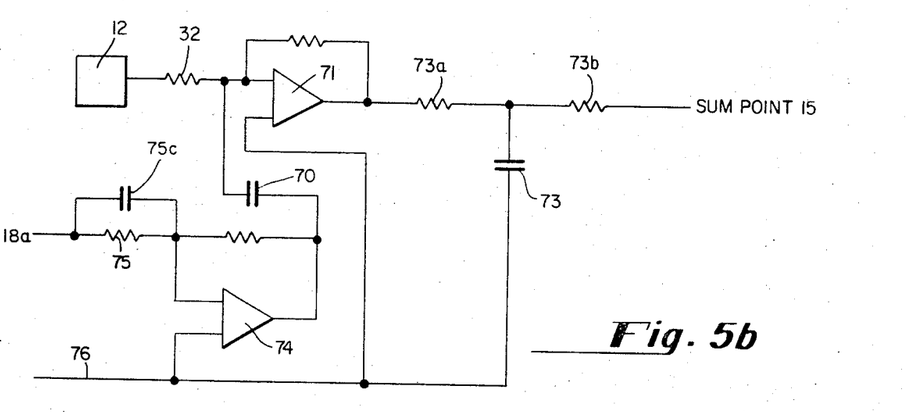
FIG. 5b is a schematic diagram of alternative circuitry which may be used in the system of FIG. 5 to apply a velocity feedback signal component to the input of the post-amplifier.

The velocity signal component derived from the slidewire contact 18a via the resistor 75, isolating amplifier 74 and capacitor 70 may have an alternate path shown in FIG. 5b. The isolating amplifier 74 is augmented with a capacitor 75c so that its output has both velocity and position signal components. Thus, the current through the capacitor 70 has acceleration and velocity components. These components are combined with the pre-amplifier 12 output by a summing amplifier 71. The acceleration component of the part of the output due to the current through the capacitor 70 is removed by a lag network comprised of resistors 73a and 73b and capacitor 73. The inner loop feedback components that are applied to the input of the post-amplifier 14 are velocity and acceleration components due to the velocity signal derived from the slidewire contact 18a and the acceleration signal derived from contact 80 as before.

Figure 5C:
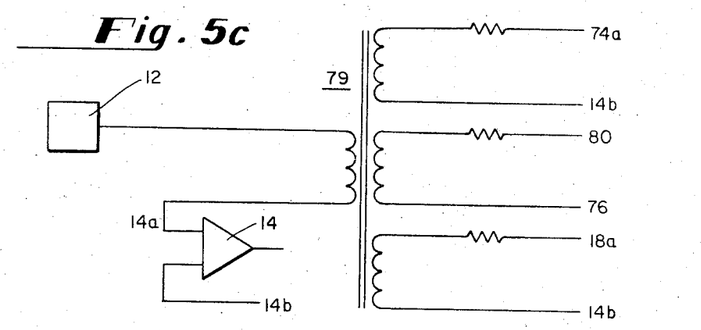
FIG. 5c is a schematic diagram of alternative circuitry which may be used in the system of FIG. 5 to sum the signals at the input of the post-amplifier.

The velocity, acceleration and motor voltage derivative feedback may be applied to the input of the post-amplifier 14 as shown in FIG. 5c. These feedback signals are applied across weighting resistors and respective windings of transformer 79 so that the current that flows through each winding is proportional to the derivative of its respective feedback voltage. The transformer 79 is of a type which produces a secondary voltage which is proportional to the sum of the primary currents. This secondary voltage is connected in series with the output voltage of pre-amplifier 12 and the input port of amplifier 14.

Figure 5D:
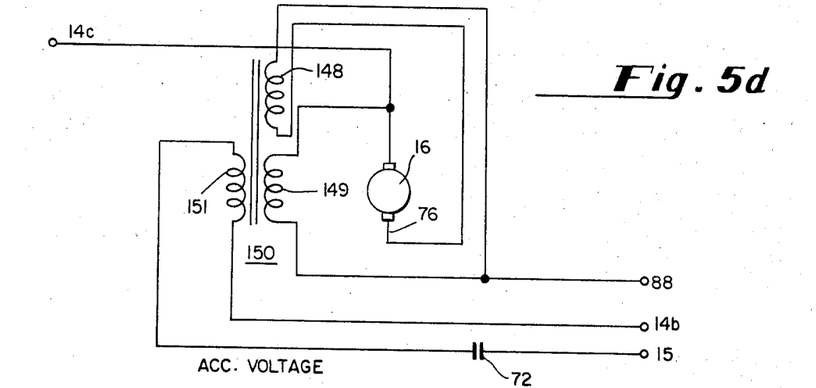
FIG. 5d is a schematic diagram of alternative circuitry which may be used in the system of FIG. 5 to produce an acceleration feedback signal component.

The acceleration feedback signal of FIG. 5 may be derived by the alternate means shown in FIG. 5d. A low impedance motor current sensing primary coil 148 of transformer 150 is placed in series with the motor. A high impedance primary coil 149 is connected between 14c and return connection 88. The voltage across this coil is a good approximation of the motor voltage since the voltage across the current sensing coil 148 is very low; thus, the secondary voltage across winding 151 is proportional to a weighted sum of motor current and motor voltage. In accordance with the invention, the phasing and number of turns of the primary coils is determined in such a way as to produce proper weights so that the secondary voltage is a velocity signal just as the velocity signal at contact 80 of FIG. 5. Of course the current sensing coil 148 may be located on the opposite side of the motor 16. A variation of FIG. 5d wherein the coil 149 is placed directly across the motor is acceptable if the impedance of coil 149 is sufficiently high so that the current sensed by coil 148 is primarily the motor current.

In the system shown in FIG. 5, the acceleration feedback gain (transfer function) depends on the tachometric coefficient of the motor, rather than on the resistance of the motor. The DC motor has a back emf which is generated at a given speed. A tachometric coefficient is defined, for purposes of this invention, as the ratio of the back emf to the motor speed. The velocity feedback gain depends on the adjustable circuit element 18a. As a result, the ratio of the gains of the velocity feedback loop (including the adjustable circuit element) and the acceleration feedback loop, is a stable quantity. This ratio represents the subsystem bandwidth. Subloop bandwidth, as used herein, is defined as the frequency range over which a subloop acts as the inverse of its feedback transfer function. System bandwidth, as used herein, is defined as the frequency range corresponding to the passband of the overall input output transfer function. The subloop bandwidth lies between the system bandwidth and the third subloop bandwidth of the embodiments shown in FIGS. 1 to 4. The stability of the subsystem bandwidth results in low sensitivity of system dynamic performance to parameter variations. In addition, low deadband is achieved due to the fact that the capacitors 70 and 72 provide capacitive feedback coupling rather than direct feedback coupling.

The existence of the acceleration feedback path through capacitor 72 permits reduction of feedback gain in the path through branch 34. There are significant reductions in the delays in response for small error signals because of this reduced feedback gain. The derivative of the motor voltage feedback is minimized by maximizing the impedance of the branch including the capacitor 38. A significant reduction in the feedback of the motor voltage derivative is achieved because backlash and/or resilience (consequent resonant frequencies) do not exist in the acceleration feedback loop and consequently the acceleration feedback loop has relatively high subloop bandwidth.

Figure 6:
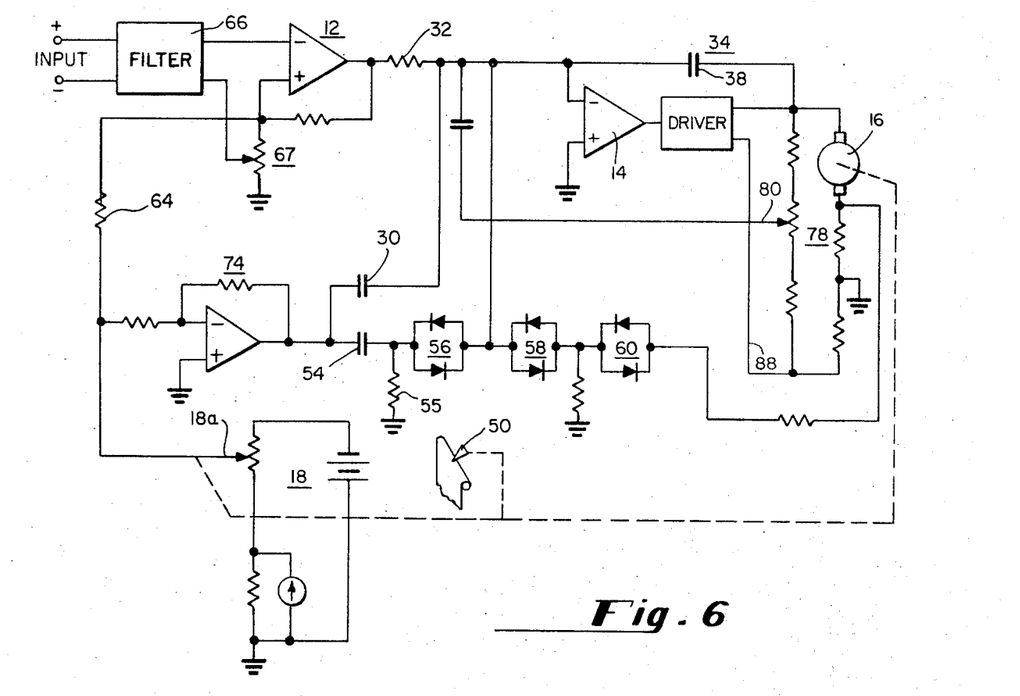
FIG. 6 is a more detailed schematic diagram of the system of FIG. 5 in a null-balance recorder.

The system of FIG. 5 is embodied in a null-balance recorder similar to FIG. 3, in FIG. 6. Once again, identical reference characters are utilized to identify the same elements.

Figure 7:
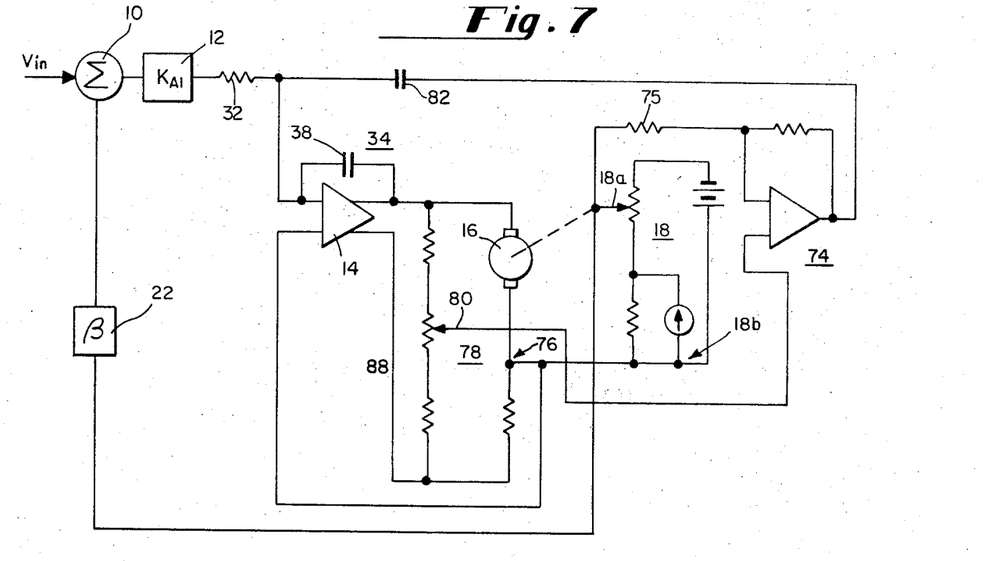
FIG. 7 is a schematic diagram of another system embodying the invention.

In FIG. 7, the reactive means of the inner feedback means comprises a single capacitor 82. This capacitor 82 provides a reactive feedback loop for both the velocity and acceleration feedback signal components. A velocity signal is derived from the difference between the voltages at tap 80 and motor terminal 76. A position signal is derived from the difference between the voltages at contact 18a and terminal 18b of the adjustable circuit means. These signals appear in series and are applied to the differential amplifier 74. The sum of the position signal and the velocity signal appears at the output of amplifier 74 and the sum is differentiated by capacitor 82 deriving the velocity signal component and acceleration signal component respectively. These signal components comprise the current through capacitor 82 which is combined with the currents through branch 34 and resistor 32 at the input of the amplifier 14. As in the case of the embodiment shown in FIG. 5, the acceleration feedback signal component which is obtained from differentiating a velocity signal derived directly from the motor 16 at the bridge circuit 78 dominates the performance of the loop that it defines over a wide frequency range since the loop that it defines does not include the nonlinearities of the mechanical coupling means between the motor 16 and the adjustable circuit element 18. The dynamic performance of the acceleration loop depends on the tachometric coefficient of the motor 16 over this wide frequency range. As a result, the bandwidth of the velocity feedback loop has improved stability with respect to parameter variations. Also, the presence of acceleration feedback permits the reduction of the feedback of the motor voltage derivative thereby reducing the IR drop component which in turn reduces the delays in response for small error variations.

Figure 8:
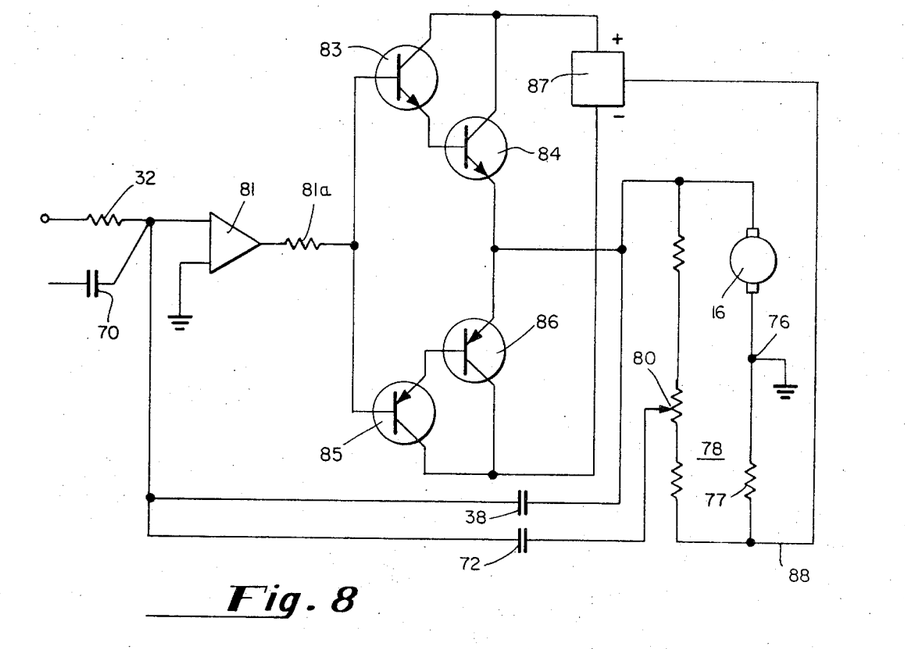
FIG. 8 is a detailed schematic diagram of a typical amplifier output current gain stage for the system shown in FIG. 5.

The dotted block labeled 7 in FIG. 5 is shown in considerably more detail in FIG. 8 with a typical amplifier output current gain stage and its associated power supply shown explicitly. The output stage comprises Darlington transistor pairs 83, 84 and 85, 86, connected for Class B operation. The power supply 87 has a positive potential connected to the collectors of the NPN transistors, a negative potential connected to the collectors of the PNP transistors and a reference potential connected to the bridge circuit 78 via the return connection 88. An independent power supply 87 is used so that all of the motor current passes through the resistor 77 in order to produce a signal proportional to the motor IR drop thereacross. Hence, a velocity signal is produced at the contact 80 with respect to the common terminal 76 which is at the same potential as an input terminal of the amplifier 81. The velocity signal is differentiated by the capacitor 72 in order to produce an acceleration feedback signal as before. The resistor 81a connecting the output of the amplifier 81 to the output stage prevents excess current from flowing when the output stage saturates.

Figure 9:
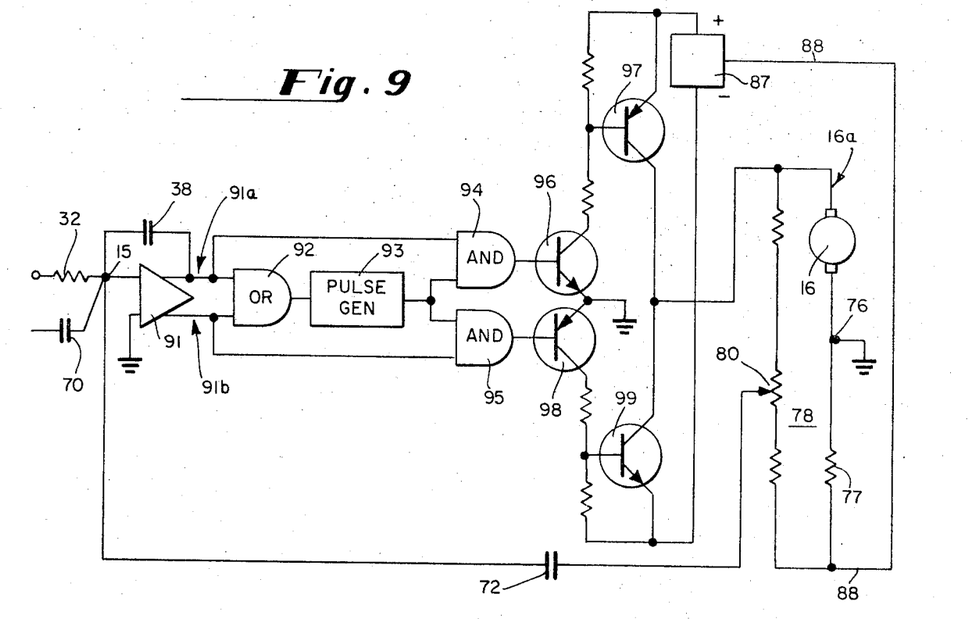
FIGS. 9 and 10 are detailed schematic diagrams of output stages utilizing switching mode amplifiers.

The dotted block labeled 7 in FIG. 5 may also be substituted by the circuit shown in FIG. 9. In FIG. 9 the output stage is a switching mode amplifier. The amplifier 91 has differential outputs, 91a and 91b, connected to the inputs of OR gate 92. The output of the OR gate is connected to an input of the pulse generator 93 in order to modulate the pulse generator pulse frequency and/or the pulse width as shown in U.S. Pat. No. 3,384,833 — Hitt and assigned to the assignee of this invention. The output of the pulse generator 93 is connected to one of the inputs of AND gate 94 and one of the inputs of AND gate 95. The other input of AND gate 94 is connected to amplifier output 91a and the other input of AND gate 95 is connected to amplifier output 91b. Coincidence between the proper polarity of the output of the amplifier 91 and the proper binary state of the output of the pulse generator 93 yields a unique output of an AND gate which causes a pulse to be delivered to the motor by way of switching transistors 96, 97 or 98, 99. The polarity of the pulse delivered to the motor is representative of the relative polarity of the differential outputs of amplifier 91. The capacitor 38 provides a feedback signal related to the derivative of the average motor voltage. As an alternative, a capacitor may be connected directly between the motor terminal 16a and sum point 15. However, averaging circuitry may be required in this path. A special advantage is provided by the invention because the capacitor 38 can be connected as shown in FIG. 9. Discrepancies between the motor voltage derivative and the feedback through capacitor 38 are tolerable because the acceleration feedback is dominant insofar as the outer loops are concerned.

Figure 10:
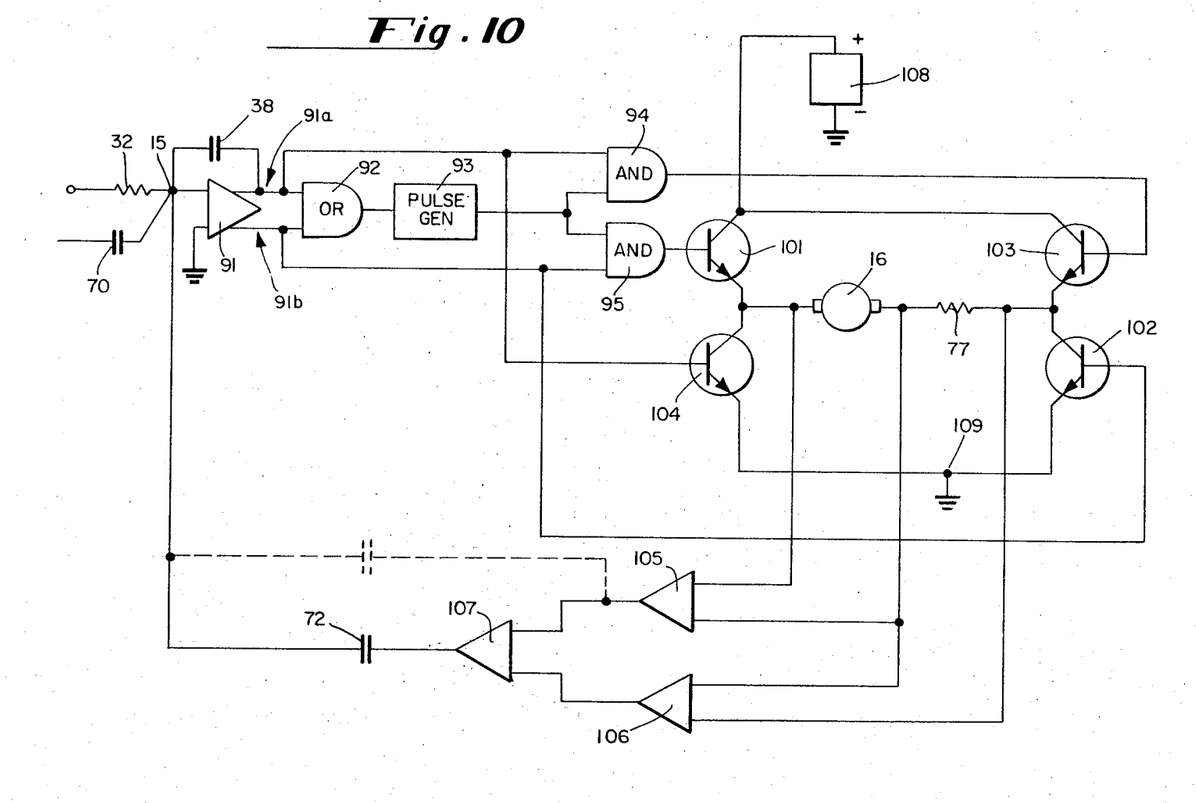

Another switching mode output stage, as shown in FIG. 10 may be substituted for the dotted portion 7 of FIG. 5. This output stage is similar to that of FIG. 9 except that a bridge type connection is employed for the switching transistors. The power supply for the switching transistor bridge is shown as a two terminal power supply 108. This may be an advantage in AC line operated instruments that are operated without a transformer. When a unique output occurs at the output of an AND gate, a pulse of proper polarity is delivered to the motor. Suppose that coincidence of the proper polarity of the output of the amplifier 91 and the binary state of the pulse generator exists so as to cause a unique output to occur from AND gate 94. This causes transistor 103 to turn ON. The proper polarity of the output of amplifier 91 causes transistor 104 to turn ON completing a current path of one polarity. The other pair of transistors 101, 102 operates in like manner, when a unique output exists from the AND gate 95, to complete a current path of the opposite polarity. It is apparent from the above discussion that the sense of the motor terminals with respect to the common 109 corresponds to the polarity. Thus a differential amplifier connected across the motor and a differential amplifier connected to resistor 77 are used to obtain motor voltage and motor IR drop signals with respect to common 109. These two signals combined by amplifier 107, cause an acceleration signal to pass through capacitor 72 to sum point 15. A capacitor connected from the output of amplifier 105 to sum point 15 is an alternative connection for capacitor 38, similar to the alternative connection for this capacitor in the circuit of FIG. 9.

In accordance with the invention, the embodiments of FIGS. 9 and 10 have an acceleration feedback path from the motor via associated circuitry. The acceleration feedback determines the bandwidth of the velocity feedback inner loop. The capacitively coupled motor voltage feedback from the output of the post-amplifier to its input has a secondary effect insofar as this bandwidth is concerned. In fact, the capacitively coupled motor voltage feedback can be minimized. This has very significant advantages for the following reasons. Most of the high frequency components of the motor voltage pulses appear in the IR drop component. When an acceleration feedback is derived from the motor voltage via a prior art capacitively coupled feedback, special filtering must be provided and/or additional dynamic range must be provided in the amplifiers or discrepancies may occur between the state of the motor and the acceleration feedback when an approximate motor voltage signal prior to pulse modulation is used for feedback, such as the feedback through capacitor 38 in FIGS. 9 and 10. By utilizing the acceleration feedback in accordance with the invention, the reduced capacitively coupled motor voltage feedback yields reduced high frequency components or discrepancies can be tolerated because this acceleration feedback is the dominant feedback.

Figure 1A:
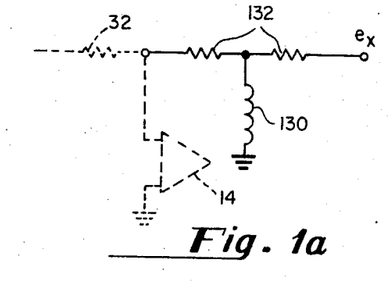
FIG. 1a is a schematic diagram of an alternative reactive network which may be utilized in the system of FIG. 1.
Figure 1B:
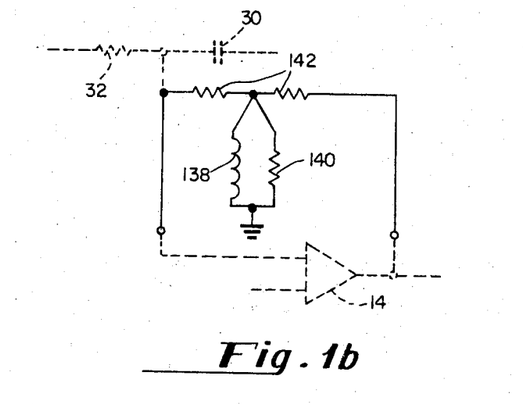
FIG. 1b is a schematic diagram of an alternative reactive network which may be utilized in the system of FIG. 1.
Figure 1C:
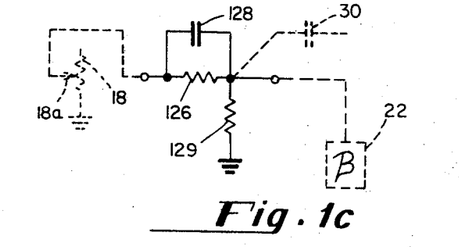
FIG. 1c is a schematic diagram of a passive proportional plus derivative circuit which may be utilized in the system of FIG. 1.

Various modifications in the network of FIGS. 1, 5, 7 and 9 may be utilized. For example, the reactive feedback means provided by the capacitors 30, 32, 70, 72 and 82 may be provided by the reactive feedback means shown in FIG. 1a as comprising a shunt inductor 130 and a series resistors 132. The reactive feedback means provided by the capacitor 38 in combination with the resistor 36 in FIGS. 1 to 4 may be provided a shunt inductor 138, a shunt resistor 140 and series resistors 142. A further modification of the embodiments of FIGS. 1 to 4 involves the use of a passive proportional plus derivative circuit shown in FIG. 1c. The passive circuit comprises a resistor 126 and a capacitor 128 connected in series and a shunt resistor 129.

In the embodiments of FIGS. 5 to 7 except FIG. 5b, the velocity and acceleration feedback signal components are applied to a single node at the input of the post-amplifier. In some instances, it may be desirable to apply the velocity and acceleration feedback signal components to different nodes. This will be the case where compensating networks are utilized to compensate for networks which establish desired system dynamic performance characteristics. For example, an extra differentiation in the velocity feedback path from the adjustable circuit means may be compensated by an extra integrator between the point where the feedback of the velocity feedback path is applied and where the feedback of the acceleration feedback is applied shown as, for example, in FIG. 5b. In any event, the signal components which are applied to the post-amplifier will represent velocity and acceleration due to the reactive means in the feedback paths.

Different motors 16 may also be utilized. For example, a two phase AC servomotor may be utilized in conjunction with a bridge connected to the control winding as shown in FIG. 6–32 on page 242 of *Control system Design*, 2nd Edition, C.J. Savant, Jr., McGraw-Hill Book Company, 1958. The resulting AC velocity signal may be demodulated to provide a DC velocity signal corresponding to the voltage at contact 80 in FIG. 6.

It will of course be understood that other modifications may be made without departing from the principles of the invention. The appended claims, are therefore, intended to cover any modification within the true spirit and scope of the invention.

What is claimed:

1. An improved null-balance servo system for measuring an unknown electrical quantity in the form of an input signal, said servo system having a first loop providing overall system feedback and second and third loops forming sub-loops within said first loop, said system comprising:

a means for producing an error signal related to the difference between an input signal and a signal for restoring balance to said system;

a DC pre-amplifier for amplifying said error signal;

a DC post-amplifier coupled to the output of said pre-amplifier;

an adjustable circuit element having an output coupled to said means for producing an error signal;

a DC motor coupled between the output of said post-amplifier and said adjustable circuit element to generate said restoring signal in response to movement of said adjustable circuit element;

a proportional plus derivative means coupled to the output of said adjustable circuit element for producing a feedback signal including a velocity component, said last named means being interposed between said adjustable circuit element and said means for producing an error signal, and a reactive feedback means coupled between said proportional plus derivative means and the input of said post-amplifier to establish said second and third loops, said second loop including said pre-amplifier, and said third loop including said post-amplifier, said motor, said adjustable circuit element, said proportional plus derivative means and said reactive means, said third loop acting like an integrator with respect to said second loop.

2. The null-balance servo system of claim 1 wherein said post-amplifier includes an output, a non-inverting input, and an inverting input and said null-balance servo system further comprises another reactive feedback means from the output of said post-amplifier to the inverting input of said post-amplifier, said post-amplifier and said reactive feedback path acting like an integrator with an integrator gain sufficiently high for the third loop to act like an integrator with respect to the second loop.

3. The null-balance servo system of claim 2 wherein a first integrator time constant for said third loop is proportional to said reactive feedback means.

4. The null-balance servo system of claim 3 wherein a second integrator time constant for said post-amplifier in combination with said second reactive feedback means is proportional to said other reactive feedback means, said integrator gain being inversely proportional to said second integrator time constant.

5. The null-balance servo system of claim 4 wherein said second integrator time constant is less than said first integrator time constant.

6. The null-balance servo system of claim 1 further comprising resistive means coupling the output of said pre-amplifier to the input of said post-amplifier.

7. The null-balance servo system of claim 6 wherein said reactive feedback means includes a capacitive means.

8. The null-balance servo system of claim 7 including shunt capacitive means in combination with said resistive means to form a low pass filter at the input of said post-amplifier.

9. The null-balance servo system of claim 6 wherein said reactive feedback means comprises inductive means.

10. The null-balance servo system of claim 1 wherein said reactive feedback means comprises capacitive means.

11. The null-balance servo system of claim 1 wherein said reactive feedback means comprises inductive means.

12. The null-balance servo system of claim 1 wherein said proportional plus derivative means comprises a feedback amplifier and lag network in the feedback of said amplifier.

13. The null-balance servo system of claim 1 wherein said third loop includes at least one integrator in cascade with said DC motor.

14. A high-speed null-balance servo system having optimal small signal response for measuring an unknown electrical quantity in the form of an input signal comprising:

a means for producing an error signal related to the difference between an input signal and a signal for restoring balance to said system;

a DC pre-amplifier for amplifying said error signal;

a DC post-amplifier coupled to the output of said pre-amplifier;

an adjustable circuit element having an output coupled to said means for producing an error signal;

a DC motor connected to the output of said post-amplifier and mechanically coupled to said adjustable circuit element to generate said restoring signal in response to movement of said adjustable circuit element;

a proportional plus derivative means coupled to the output of said adjustable circuit element for producing a feedback signal including a velocity component, said proportional plus derivative means establishing a first dominant system time constant; and a reactive means coupling said feedback signal to the input of said post-amplifier so as to establish a second dominant system time constant proportional to said reactive means.

15. The null-balance servo system of claim 14 wherein said first dominant time constant established by said proportional plus derivative means and said second dominant system time constant established by said reactive means are substantially equal.

16. A null-balance servo system having an optimal small signal response for measuring an unknown electrical quantity in the form of an input signal comprising:

a means for producing an error signal relating to the difference between an input signal and an overall feedback signal for restoring balance to said system;

a DC pre-amplifier for amplifying said error signal;

a DC post-amplifier coupled to the output of said pre-amplifier;

a means for producing feedback signals comprising a DC motor and associated circuitry connected to the output of said post-amplifier and an adjustable circuit element mechanically coupled to said motor;

an outer loop feedback means coupling said adjustable circuit element of said means for producing feedback signal to said means for producing an error signal so as to apply said overall system feedback signal to said means for producing an error signal; and an inner loop feedback means including reactive means for coupling said means for producing feedback signals to the input of said post-amplifier and applying a velocity feedback signal component to the input of said post-amplifier and an acceleration feedback signal component to the input of said post-amplifier, said acceleration feedback signal component being substantially free of the voltage drop across the motor resistance.

17. The system of claim 16 wherein said means for producing feedback signals further comprises a proportional plus derivative means connected to the output of said adjustable circuit element, said outer loop feedback means being coupled to the output of said proportional plus derivative means.

18. The system of claim 17 wherein said inner loop feedback means is also coupled to the output of said proportional plus derivative means.

19. The system of claim 16 wherein said inner loop feedback means is coupled to said associated circuitry of said DC motor and said adjustable circuit element so as to apply said velocity and acceleration feedback signal components to the input of said post-amplifier.

20. The system of claim 19 wherein said inner loop feedback means comprises a first reactive feedback path from said adjustable circuit element to said post-amplifier for said velocity signal component and a second reactive feedback path from said associated circuitry of said DC motor to said post-amplifier for said acceleration signal component.

21. The system of claim 20 wherein said associated circuitry comprises a bridge including said motor as an arm in said bridge, said second reactive feedback path being connected to said bridge.

22. The system of claim 19 wherein said reactive means of said inner loop feedback means comprises a single reactive feedback path coupled to said adjustable circuit element and said associated circuitry of said motor.

23. The system of claim 16 further comprising a phase switching circuit wherein said associated circuitry comprises switching transistors coupled to and controlled by said switching circuit for providing a switch mode operation of said motor.

24. An improved null-balance servo system for measuring an unknown electrical quantity in the form of an input signal having an overall positional feedback loop, a velocity feedback inner loop and an acceleration feedback inner loop of high sub-loop bandwidth for significantly reducing the effect of variations of motor resistance and significantly reducing the effect of variations of motor torque sensitivity, comprising:
  means for producing an error signal relating to the difference between an input signal and an overall feedback signal for restoring balance to said system;
  a DC pre-amplifier for amplifying said error signal;
  a DC post-amplifier coupled to the output of said pre-amplifier;
  means for producing feedback signals including a DC motor having an electrical input connected to the output of said post-amplifier, and an adjustable circuit element having a mechanical input coupled to the mechanical output of said motor and a variable electrical output producing an overall positional feedback signal;
  overall positional feedback loop means coupling the output of said adjustable circuit element to the input of said pre-amplifier; and
  inner loop feedback means coupling the output of said adjustable circuit element in said velocity feedback inner loop and said motor electrical input to the input of said post-amplifier in said acceleration feedback inner loop so as to respectively apply a velocity feedback signal component and an acceleration feedback signal component to the input of said post-amplifier, said acceleration feedback signal component being substantially independent of the voltage drop across the motor resistance.

25. The system of claim 24 wherein said means for producing feedback signals further comprises a bridge wherein said motor forms one leg of said bridge on one side of said bridge, said inner loop feedback means including a reactive means coupled to a terminal on the opposite side of said bridge so as to apply said acceleration feedback signal component to the input of said post-amplifier.

26. The system of claim 24 wherein said means for producing feedback signals further comprises a differential amplifier means and an impedance connected in series with said motor for generating a signal representing the voltage drop across the motor resistance, said differential amplifier means coupled to said motor and said impedance for generating a velocity signal representative of the motor voltage minus the voltage drop across the motor resistance, said inner loop feedback means including reactive means coupling the output of said differential amplifier means to the input of said post-amplifier to apply said acceleration feedback signal component to the input of said post-amplifier.

27. The system of claim 24 wherein said means for producing feedback signals further comprises a plurality of interconnected switching transistors and pulse generating means having an output coupled to said post-amplifier and an input coupled to said switching transistors for generating a pulsed output from said switching transistors which is a function of the output from said post-amplifier, said pulsed output being applied to said motor.

28. The system of claim 27 wherein said means for producing said feedback signal further comprises a bridge wherein said motor forms one leg of said bridge, said inner loop feedback means including reactive means coupled between said bridge and the input of said post-amplifier so as to apply said acceleration feedback signal component to the input of said post-amplifier.

29. The system of claim 27 wherein said switching transistors form a bridge, said means for producing said feedback signals further comprising an impedance connected in series with said motor and across said bridge and differential amplifier means coupled to said motor and said impedance for generating a velocity signal representative of the motor voltage minus the voltage drop across the motor impedance, said inner loop feedback means including a reactive means coupling the output of said differential amplifier to the input of said post-amplifier for applying said acceleration signal components thereto.

* * * * *

UNITED STATES PATENT OFFICE
CERTIFICATE OF CORRECTION

Patent No. 3,732,478     Dated May 8, 1973

Inventor(s) Samuel J. MacMullan

It is certified that error appears in the above-identified patent and that said Letters Patent are hereby corrected as shown below:

Column 1, line 56, "balance" should read --unbalance--.

Column 3, line 14, "in" should read --is--.

Column 5, line 62, "$(kC_{30}R_{26}C_{28})/C_{38m}$" should read --$(kC_{30}R_{26}C_{28})/C_{38}\tau m)$--.

Column 6, line 14, "$R_{32}C_{30}/K_{Al}\beta$" should read --$R_{32}C_{30}/k_{Al}\beta$--

Column 6, line 47, equation (4), the opening parenthesis before "$e_x B$" has been omitted.

Column 6, line 51, equation (5), "$e_x'(r_{32}/K_{Al})$" should read --$e_x'(R_{32}/K_{Al})$--.

Column 7, line 11, after "time" insert --constant--.

Column 7, lines 25-30, table should appear as follows:

| System Type (Figure No.) | $R_{34}$ | $C_{30}$ microfarads | $C_{28}$ microfarads ($R_{26}$=10k) | $C_{42}$ microfarads | $R_{40}$ |
|---|---|---|---|---|---|
| 2 | $\cong \tau_m/C_{38}$ | 2 | 1 | 4 | 5000 |
| 1 | $\cong \tau_m/C_{38}$ | 2 | 1 | 0 | 0 |

Signed and sealed this 2nd day of July 1974.

(SEAL)
Attest:

EDWARD M. FLETCHER, JR.
Attesting Officer

C. MARSHALL DANN
Commissioner of Patents